United States Patent
Ha et al.

(10) Patent No.: US 10,332,301 B2
(45) Date of Patent: Jun. 25, 2019

(54) 3D GRAPHIC RENDERING METHOD AND APPARATUS

(71) Applicant: SAMSUNG ELECTRONICS CO., LTD., Suwon-si (KR)

(72) Inventors: Inwoo Ha, Seongnam-si (KR); Minsu Ahn, Yongin-si (KR); Hyong Euk Lee, Suwon-si (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 15/343,972

(22) Filed: Nov. 4, 2016

(65) Prior Publication Data

US 2017/0132830 A1    May 11, 2017

(30) Foreign Application Priority Data

Nov. 6, 2015   (KR) .................. 10-2015-0156129
Jun. 2, 2016   (KR) .................. 10-2016-0068960

(51) Int. Cl.
| | |
|---|---|
| *G06T 15/80* | (2011.01) |
| *G06T 15/00* | (2011.01) |
| *G06T 15/55* | (2011.01) |
| *G06T 15/60* | (2006.01) |
| *G06T 17/20* | (2006.01) |

(52) U.S. Cl.
CPC .......... *G06T 15/005* (2013.01); *G06T 15/55* (2013.01); *G06T 15/60* (2013.01); *G06T 15/80* (2013.01); *G06T 17/20* (2013.01)

(58) Field of Classification Search
CPC .................................................. G06T 15/80
See application file for complete search history.

(56) References Cited

U.S. PATENT DOCUMENTS

| | | | |
|---|---|---|---|
| 5,905,500 A | 5/1999 | Kamen et al. | |
| 2008/0260283 A1 | 10/2008 | Ivansen et al. | |
| 2009/0102843 A1 | 4/2009 | Sloan et al. | |
| 2010/0026684 A1 | 2/2010 | Hasselgren et al. | |
| 2013/0093766 A1 | 4/2013 | Hutchins et al. | |
| 2013/0127891 A1* | 5/2013 | Kim ....................... G06T 15/00 | |
| | | | 345/582 |
| 2015/0070355 A1* | 3/2015 | Clarberg ............... G06T 15/005 | |
| | | | 345/426 |
| 2015/0178983 A1 | 6/2015 | Akenine-Moller et al. | |

(Continued)

FOREIGN PATENT DOCUMENTS

| | | |
|---|---|---|
| EP | 2 849 154 A1 | 8/2014 |
| EP | 2833326 A1 | 2/2015 |

(Continued)

OTHER PUBLICATIONS

He, Yong, Yan Gu, and Kayvon Fatahalian. "Extending the graphics pipeline with adaptive, multi-rate shading." ACM Transactions on Graphics (TOG) 33.4 (2014): 142.*

(Continued)

*Primary Examiner* — Ryan McCulley
(74) *Attorney, Agent, or Firm* — NSIP Law

(57) ABSTRACT

A three-dimensional (3D) rendering method and apparatus is disclosed. The 3D rendering apparatus may determine a select shading point in a 3D scene on which shading is to be performed, perform the shading on the determined shading point, and determine shading information of the 3D scene based on a result of the shading performed on the determined shading point.

31 Claims, 12 Drawing Sheets

(56) References Cited

U.S. PATENT DOCUMENTS

2016/0048999 A1* 2/2016 Patney .................. G06T 15/80
                                                        345/426
2016/0049000 A1* 2/2016 Patney .................. G06T 15/80
                                                        345/426

FOREIGN PATENT DOCUMENTS

| KR | 10-2012-0085066 A | 7/2012 |
|----|-------------------|--------|
| KR | 10-1407639 B1     | 6/2014 |
| KR | 10-1465487 B1     | 11/2014 |
| KR | 10-2015-0042095 A | 4/2015 |
| KR | 10-1511273 B1     | 4/2015 |

OTHER PUBLICATIONS

Burns, Christopher A., et al. "A Lazy Object-Space Shading Architecture With Decoupled Sampling." High-Performance Graphics 2010: ACM Siggraph / Eurographics Symposium Proceedings; Saarbrucken, Germany, Jun. 25-27, 2010, Eurographics Association, 2010, pp. 19-28. (10 pages in English).

Liktor, Gábor, et al. "Decoupled Deferred Shading for Hardware Rasterization." Proceedings of the ACM SIGGRAPH Symposium on Interactive 3D Graphics and Games. ACM, Mar. 9, 2012, pp. 143-150. (8 pages in English).

Schied, Christoph et al. "Deferred Attribute Interpolation for Memory-Efficient Deferred Shading." Proceedings of the 7th Conference on High-Performance Graphics, Aug. 1, 2015, pp. 43-49. (8 pages in English).

Extended European Search Report dated Apr. 5, 2017 in counterpart European Application No. 16197470.4. (11 pages in English).

* cited by examiner

3D GRAPHIC RENDERING METHOD AND APPARATUS

CROSS-REFERENCE TO RELATED APPLICATION(S)

This application claims the benefit under 35 USC 119(a) of Korean Patent Application No. 10-2015-0156129 filed on Nov. 6, 2015, and Korean Patent Application No. 10-2016-0068960 filed on Jun. 2, 2016, in the Korean Intellectual Property Office, the entire disclosures of which are incorporated herein by reference for all purposes.

BACKGROUND

1. Field

The following description relates to image processing technology performing three-dimensional (3D) rendering.

2. Description of Related Art

In three-dimensional (3D) computer graphics, a graphics pipeline or a rendering pipeline refers to one or more processors configured to generate a 3D image as a two-dimensional (2D) raster image or rastered image information through a staged or pipeline approach.

The graphics pipeline includes a vertex shader configured to perform a mathematical operation on vertex information of a 3D object to provide a special effect to the 3D object, and a pixel shader configured to calculate a color of each pixel. The vertex shader may perform an operation of, for example, translocating the 3D object to a special location based on the vertex information and changing a texture or a color. The pixel shader may apply a complex operation of, for example, reading a color from a texture, applying light, and processing a shadow, reflected light, or transparency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a three-dimensional (3D) rendering method to render a 3D scene, the method including determining a select shading point in a 3D scene on which shading is to be performed, performing the shading on the determined shading point, and determining shading information of the 3D scene based on a result of the shading performed on the determined shading point.

The determining of the select shading point may be based on a determined shading level for an area of the 3D scene, and is distinct from a determining of a select shading point for another area of the 3D scene.

The determining of the select shading point results in a different number of shading points may be determined depending on which shading level, of plural shading levels representing different shading complexities, is determined according to temporal and/or spatial analyses of the area of the 3D scene as the determined shading level for the 3D scene.

The determining of the select shading point may include determining less than all of vertices of an area of the 3D scene to be shading points on which the shading is performed.

The determining of less than all of the vertices of the area of the 3D scene to be shading points may further include determining at least one non-vertex point on a 3D object in the area of the 3D scene to also be a shading point on which the shading is performed.

The determining of less than all of the vertices of the area of the 3D scene to be shading points may include determining that no vertices of the area are selected as shading points.

The determining of less than all of the vertices of the area of the 3D scene to be shading points may include determining that the shading points include at least one vertex of the area of the 3D scene.

The determining that the shading points include at least one vertex of the area of the 3D scene may include determining that the shading points include all vertices of the area of the 3D scene.

The method may further include interpolating shading values for remaining vertices of the area of the 3D scene, other than the less than all of the vertices of the area of the 3D scene, based on results of one or more of the shading of the less than all of the vertices of the area of the 3D scene, and rendering an image by determining pixel color values from the determined shading information of the 3D scene.

The determining of the select shading point may include determining all vertices of a 3D object in the 3D scene and an additional point on the 3D object to be select shading points on which the shading is to be performed.

The determining of the select shading point may be based on at least one of analyses of spatial characteristics and temporal characteristics of the 3D scene.

The determining of the select shading point may further include determining the select shading point based on at least one of information associated with a virtual light source, information associated with a virtual camera, information associated with a 3D object in the 3D scene, and a result of shading performed on a previous image frame.

The information associated with the virtual light source may include information on at least one of a location, a color, a brightness, a direction, an angle, and a moving speed of the virtual light source, the information associated with the virtual camera may include information on at least one of a location, a direction, an angle, and a moving speed of the virtual camera, and the information associated with the 3D object may include information on at least one of a shape, a color, and a material of the 3D object.

The determining of the select shading point may include grouping vertices in the 3D scene into different vertex groups, and determining at least one select shading point for each vertex group.

The grouping of the vertices may include grouping the vertices into the different vertex groups based on at least one of respective locations of the vertices, respective normals of the vertices, a result of shading performed on a previous image frame, and which vertices are for a same 3D object.

The determining of the select shading point may further include determining a shading level for a first vertex group, of the different vertex groups, based on at least one of a movement of a virtual light source, a movement of a virtual camera, a movement of a 3D object, a difference in brightness between neighboring vertices, and a location of a vertex in the vertex group.

The determining of the select shading point may further include determining respective shading points on which the shading is to be performed for each vertex group based on respectively determined shading levels for each vertex group.

The grouping of the vertices may include determining respective hierarchical structure information associated with vertices for each vertex group, each hierarchical structure information representing plural different complexity levels for each vertex group, and the determining of the at least one select shading point for each vertex group may include selecting different respective shading points for each vertex group based on which complexity level is respectively determined for shading each vertex group from the respective hierarchical structure information.

The determining of the shading information may include determining a shading value of a vertex adjacent to shading points, for which shading was performed to determine their respective shading values, without performing shading by interpolating shading values from the respective shading values of the shading points.

The method may further include determining color values of pixels in an image obtained by rendering the 3D scene by interpolating determined shading values of shading points, as determined in the determining of the shading information.

The determining of the shading information may include storing, in a texture buffer, the respective shading values of the shading points and the shading value of the vertex.

The method may further include performing a pixel shading operation using the shading values stored in the texture buffer to determine color values of pixels in an image to render the image.

The performing of the shading may include determining a color value of the select shading point based on an illumination effect by at least one of a direct light source and an indirect light source, wherein the illumination effect may include a shadow effect by an occlusion.

In another general aspect, a non-transitory computer-readable storage medium may store instructions that, when executed by a processor, cause the processor to perform one or more or all methods described herein.

In another general aspect, a three-dimensional (3D) rendering apparatus may include at least one processor configured to: determine a select shading point in a 3D scene on which shading is to be performed; perform the shading on the determined shading point; and determine shading information of the 3D scene based on a result of the shading performed on the determined shading point.

The apparatus may further include at least one memory storing computer-readable instructions to cause the at least one processor to implement the determining of the select shading point, the performing of the shading, and the determining of the shading information, the at least one processor being configured to execute the instructions.

The processor may be configured to execute the instructions such that the processor is further configured to determine whether to update a shading value of a current vertex in a subsequent image frame based on at least one of a distance between the current vertex and a screen and whether the current vertex is located in a shadow area.

The determining of the select shading point may include determining a shading value of at least one vertex adjacent to determined shading points and another non-vertex shading point, for which shading was both performed to determine their respective shading values, without performing shading on the one vertex and by interpolating shading values of the respective shading values.

The determining of the select shading point may include grouping vertices in the 3D scene into vertex groups, and determining at least one shading point for each vertex group based on a shading level.

In another general aspect, a three-dimensional (3D) rendering apparatus may include a graphics pipeline including a vertex shader and a pixel shader, and a shading point shader configured to: determine a select shading point in a 3D scene on which shading is to be performed; perform the shading on the determined shading point; and determine shading information of the 3D scene based on a result of the shading performed on the determined shading point.

The shading point shader may store the shading information in a texture buffer, and the pixel shader may generate pixel color information to render an image based on the shading information stored in the texture buffer.

The shading point shader may determine the select shading point from among vertices of the 3D scene identified to the shading point shader by the vertex shader.

Other features and aspects will be apparent from the following detailed description, the drawings, and the claims.

BRIEF DESCRIPTION OF THE DRAWINGS

Throughout the drawings and the detailed description, the same drawing reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
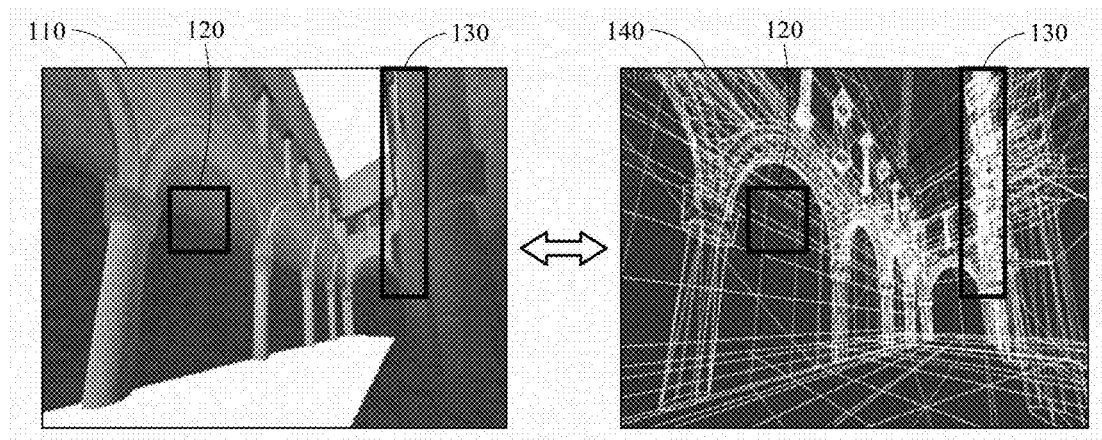
FIG. 1 is a diagram illustrating an example of a three-dimensional (3D) scene and a vertex structure in the 3D scene for explaining one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples to be described hereinafter may be applied to generate, create, or transform from three-dimensional (3D) information, such as of virtual or captured real world objects, a rendered image or information of the rendered image by rendering, i.e., rendering processing, a 3D scene using one or more processors configured accordingly. The rendering of the 3D scene may include a shading process in which a color of a 3D object is determined based on light radiated from a virtual light source providing an illumination effect to the 3D scene.

FIG. 1 is a diagram illustrating an example of a 3D scene 110 and a vertex structure 140 of the 3D scene 110.

In vertex-based light shading, as only an example, when the shading is performed on vertices of a 3D object, e.g., at a vertex level, color values of pixels for the 3D object may subsequently be determined by interpolating shading values of the vertices after the shading is performed. As only an example, a graphics pipeline of one or more embodiments may include a vertex shader, e.g., before an optional rasterizer in the graphics pipeline, configured to perform mathematical operation(s) on or for vertices or vertex information for a 3D object, and which may also be used to provide special effects to the ultimately rendered 3D object at a vertex level, for example. 3D graphics information may be acquired or provided to the vertex shader and the vertex shader may be configured to generate or determine the vertices, or some or all of the vertex information may be acquired/provided to the vertex shader. The graphics pipeline may further include a pixel shader configured to calculate a color of each pixel, such as for the pixels generated, identified, or output by such a rasterizer or for pixels identified/determined from vertex information for the 3D object, for example. The graphics pipeline may be a processor or hardware processing element or a combination of processors or hardware processing elements. In addition, depending on embodiment, there may be many graphics pipelines that may operate synchronously and/or asynchronously. Some or all of the graphics pipelines may also be configured in parallel.

Figure 9:
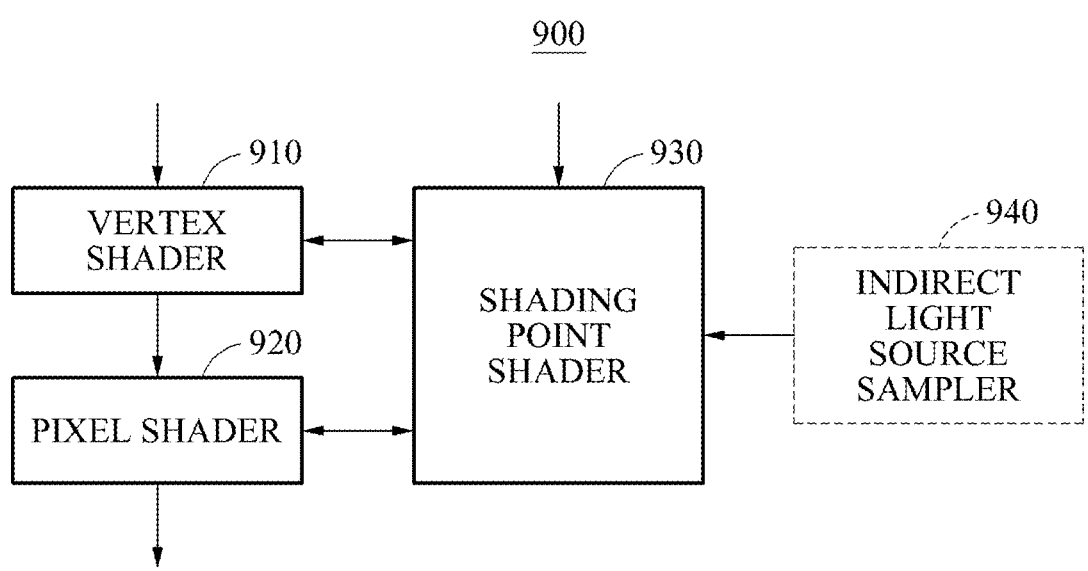
FIG. 9 is a diagram illustrating an example of a 3D rendering apparatus.

The vertex shader may be configured to perform an operation of, for example at the vertex level, translocating the 3D object to be in a special location in a space, such as a normalized space, based on the vertex information. Typically, a vertex shader may be configured to perform one or more additional computation operations, such as an adding and/or changing of a texture or a color of the 3D object or selective lighting computations for light shading at the vertex level. Likewise, typically a pixel shader may be configured to implement one or more complex operations of, for example at a pixel level, reading a color from a set or determined texture and, based on results of previous operations in the graphics pipeline, to ultimately calculate the color of each pixel in a scene, frame, region, area, object, or object portions. For example, a typical pixel shader may be configured to selectively apply light from defined light sources and process a shadow, reflected light, or transparency, for ultimately calculating the color of each pixel. In addition, and depending on embodiment, the graphics pipeline may further include a rasterizer, or the same operation may be implemented by either of the vertex shader or the pixel shader or another shader stage of the graphics pipeline. Rasterizing refers to a type or way of representing image information in a computer or computing technology, and may include generating and/or outputting two-dimensionally arranged pixels that are organized or ordered at preset intervals, for example. As an example, the rasterization may be performed on 3D graphics information, which may not be in a pixel format, to generate or output such pixels so additional operations can subsequently be performed at a pixel level. In one or more embodiments, the rasterizer in the graphics pipeline may perform rasterization on the vertices or vertex information resulting from operations performed by at least the vertex shader, for example. As only a non-limiting example, FIG. 9 illustrates example vertex and pixel shaders 910, 920.

With respect to the typical vertex shader, the complexity of the vertex structure produced by the vertex shader may result from a geometric complexity in each area of the original or input 3D graphics information, so when light shading is typically performed by a vertex shader or at the vertex level a resultant shading complexity may result from a complexity in the shading or from whether a special effect, for example, specular reflection and diffused reflection, was applied. Thus, in such a typical vertex-based shading, or light shading performed the vertex level, a geometry complexity of each area in the 3D scene 110 of FIG. 1 may not correspond to the shading complexity. For example, when performing such a typical vertex-based shading, an image quality may be degraded in an area 120 because the number of resulting vertices is small due to a low geometry complexity though a high shading complexity is needed or desired, such as based on the number or locations of typical lighting effects. This may be referred to as an under-sampling in the resultant vertex complexity. Alternatively, in an area 130 where the number of vertices is large due a high geometry complexity, and a low shading complexity is needed or desired, the typical additional per vertex shading operations may be unnecessary. This may be referred to as an over-sampling in the resultant vertex complexity. This is also similar to when typical shading operations are performed by a typical pixel shader, where there may be an unnecessary number of typical shading operations performed because the shading may be performed at a pixel level. Here, the unnecessary term may refer to a number of operations or an amount of processing that are/is typically performed that if had not been performed then the overall processing could have taken less time or less processing power, could have been performed with less energy expenditures, or an overall increased rendered frame rate could have been achieved, as only examples.

There are problems with such rendering hardware technologies in that depending on where light shading, as only an example, is performed in the typical graphics pipeline, e.g., within a typical vertex shader or typical color shader, areas of a rendered scene may have a degraded color quality in areas that represent insufficiently (i.e., "under-sampled") generated vertex complexity for a given color complexity. In addition, with such typical implementations, potentially unnecessary (i.e., "over-sampled") vertex calculations may be performed for other areas where there is less color complexity.

One or more embodiments include a 3D rendering method and apparatus that may adaptively determine a select shading sample point, also referred to as a shading point, on which shading is to be performed based on a spatial characteristic or a temporal characteristic of the 3D scene 110, and perform the shading on the determined shading sample point to facilitate more rapid shading without degradation in a quality of a rendered image, such as with adaptive capabilities to minimize such aforementioned over-sampling and under-sampling. For example, in an area in which the number of vertices is large compared to a shading complexity, for example, the area 130, one or more embodiments of the 3D rendering method and/or apparatus may decrease, or select to decrease, a density of shading sample points to reduce the number of times the shading is performed, e.g., compared to the typical performing shading for every vertex, and thereby increasing a speed of a rendering process. In addition, in an area in which the number of vertices is low compared to a shading complexity, for example, the area 120, one or more embodiments of the 3D rendering method and/or apparatus may increase, or select to increase, a density of shading sample points to increase the number of times the shading is performed, e.g., compared to the typical only performing shading for every vertex, and thereby increase image quality of a rendering process.

As noted above, the adaptive shading may be performed in combination with a graphics pipeline, such as in combination with any of the shader processor(s), e.g., as a single processor, or as a separate adaptive shader processing element or processor. In an example, the adaptive shading may be performed through one or more shading point shaders as another processor or processing element in parallel with one or more graphics pipelines, such as demonstrated in FIG. 9. In an example, graphics pipelines and/or the one or more shading point shaders 930 of FIG. 9 may be configured as a single processor, a single processor with multiple cores, or one or more such processors that may be variably designed to include such processing elements of the graphics pipelines and the shading point shaders 930. With FIG. 9, one or more vertex shaders 910 and/or one or more pixel shaders 920 may be configured as described above and to respectively operate in cooperation with the adaptive light shading of the shading point shader(s) 930. In an example, one or more vertex shaders 910 and/or one or more pixel shaders 920 may be configured, or controlled through firmware for example, to operate in combination with one or more corresponding shading point shader(s) 930 as described herein.

For example, and as will be explained in more detail further below, when shading complexity is such that there is a need or desire for more shading sample points than vertices, e.g., where one or more or all of the vertices are used as shading sample points, or there is a desire for more shading sample points in areas between or near one or more of the vertices, then the one or more shading point shader(s) 930 may determine additional shading sample points between or other than the vertices to use solely or in combination with all or select vertex shading sample points to perform light shading, for example. Here, such example needs or desires for the same, more, or less shading complexity may be based on determined spatial characteristics and/or determined temporal characteristics of a 3D scene, or corresponding comparisons within and between frames, so shading of a scene, frame, regions, areas, objects, or portions of objects can be adaptively performed to facilitate more efficient rendering, such as with more rapid shading without degradation in a quality of a rendered image compared to the aforementioned typical vertex shader only or typical pixel shader only shading approaches.

Though particular embodiments or examples have been discussed above, it is respectfully submitted that such embodiments or examples are only for example purpose and are not intended to be limiting on the present disclosure as additional and/or alternative embodiments are also available.

Figure 2:
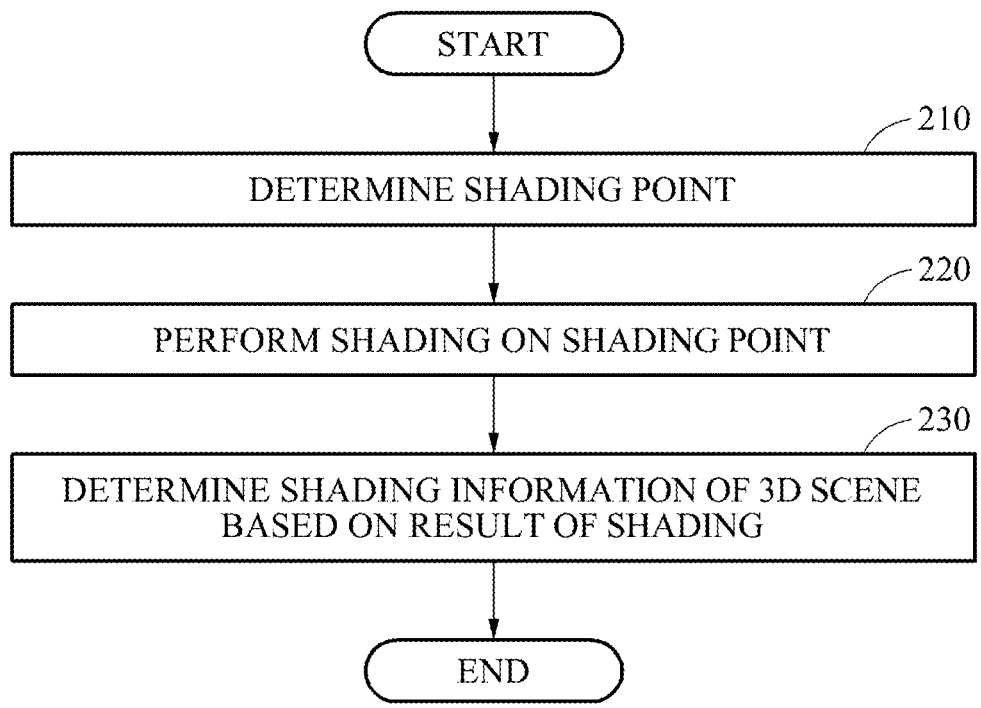
FIG. 2 is a flowchart illustrating an example of a 3D rendering method.

FIG. 2 is a flowchart illustrating an example of a 3D rendering method. The 3D rendering method may be performed by a 3D rendering apparatus, for example, a 3D rendering apparatus 900 illustrated in FIG. 9 and 3D rendering apparatuses 1010 and 1015 illustrated in FIGS. 10A and 10B, noting that embodiments are not limited to the same. Thus, below, though the method of FIG. 2, as well as the respective methods of FIGS. 3-8B, will be explained through reference to respective 3D rendering apparatuses, embodiments may include any or any combination of, but are not limited to, the 3D rendering apparatuses described herein.

Referring to FIG. 2, in operation 210, the 3D rendering apparatus determines a shading point (i.e., the aforementioned shading sample point) in a 3D scene on which shading is to be performed. The 3D rendering apparatus may determine any point in the 3D scene to be the shading point. For example, the 3D rendering apparatus may determine, to be the shading point on which the shading is to be performed, a point at which vertices of a 3D object in the 3D scene are located and also a point at which the vertices are not located. The shading point may be determined based on at least one of a spatial characteristic and a temporal characteristic of the 3D scene. The points at which the shading is to be performed may vary based on the spatial characteristic or the temporal characteristic of the 3D scene. For example, in some regions or areas the shading points may be determined to correspond to only one or more or all of the corresponding vertices, such as predefined or determined by a vertex shader in the current frame or a previous frame, the shading points may be determined to correspond to some or all of the vertices and additional non-vertex shading points, or the shading points may be determined to correspond to only the additional non-vertex shading points.

The 3D rendering apparatus may determine such shading points based on, for example, information associated with one or more virtual light sources configured to provide an illumination effect, information associated with one or more virtual cameras configured to determine respective views at which the 3D object is viewed, information associated with the 3D object in the 3D scene, and shading information of a previous image frame. Such information associated with a virtual light source may include information on, for example, a location, a color, a direction, and a moving speed of the virtual light source, a distance between the virtual light source and the 3D object in the 3D scene, and an angle formed between the virtual light source and the 3D object, for example. Such information associated with a virtual camera may include information on, for example, a location, a direction, and a moving speed of the virtual camera, and an angle formed between the virtual camera and the 3D object in the 3D scene, for example. Such information associated with the 3D object may include information on, for example, a shape, a color, and a material of the 3D object, and such shading information of the previous image frame may include a shading value of a vertex used in the previous image frame, for example.

In an example, the 3D rendering apparatus may group vertices into a plurality of vertex groups, and determine one or more shading points for each vertex group on which the shading is to be respectively performed. The method may include determining the shading complexity for a current scene, frame, region, area, object, object portions, or corresponding vertex group, based on the spatial characteristic or the temporal characteristic of the 3D scene, for example. The determining of the shading complexity may include comparing spatial and/or temporal characteristics within and/or between such scene(s), frame(s), region(s), area(s), object(s), object portions, or corresponding vertex group to determine whether a fine shading or coarse shading is desired, or whether a greater shading complexity or lesser shading complexity is desired. For example, when fine shading is determined to be desired, the 3D rendering apparatus may increase the number of shading points on which the shading is to be performed by additionally determining an additional shading point in the 3D scene to be a shading point, e.g., in addition to vertices included in the corresponding vertex group. When coarse shading, or less shading complexity, is determined to be desired, the 3D rendering apparatus may determine, to be a shading point, only or only some vertices among the vertices included in the corresponding vertex group or at least one shading point in the 3D scene regardless of whether the shading point is a vertex or not. As determined necessary or desirable, the 3D rendering apparatus may determine, to be a shading point, a non-vertex point in the 3D scene, in addition to some vertices among the vertices of the corresponding vertex group, for example, of the 3D object in the 3D scene. Thus, the 3D rendering apparatus may more effectively perform the shading by determining the shading points based on the spatial characteristic or the temporal characteristic of the 3D scene, for example, without performing the shading on all vertices or pixels of 3D objects in the 3D scene as would have been respectively performed by typical vertex shader light shading or typical pixel shader light shading approaches.

Figure 3:
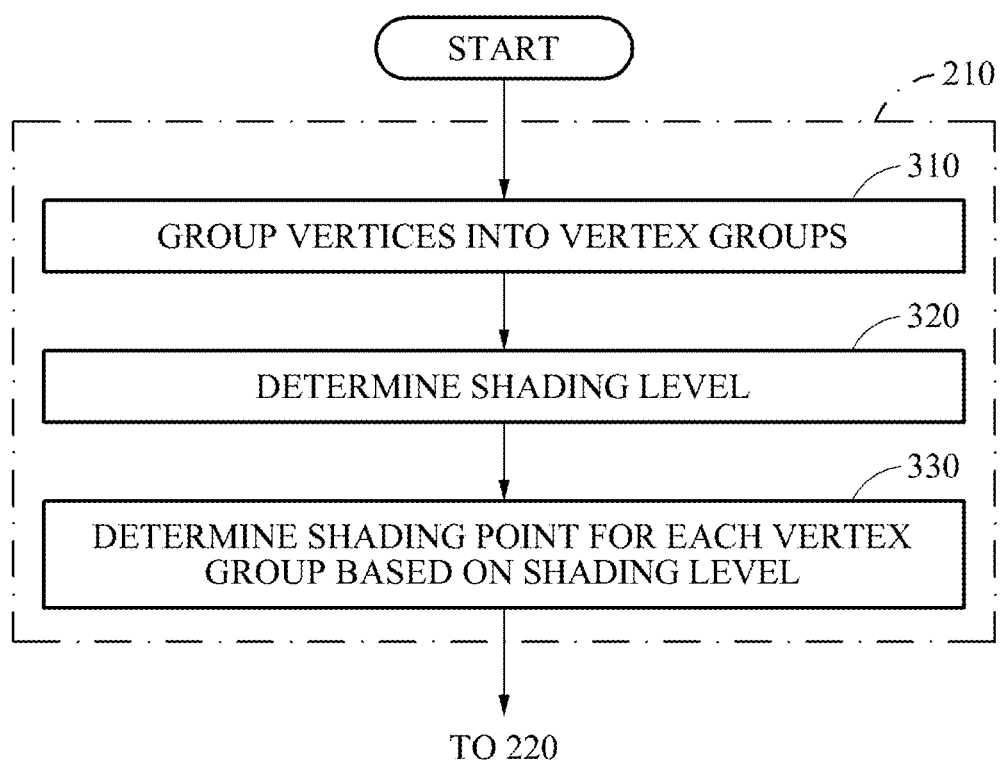
FIG. 3 is a flowchart illustrating an example of a method of determining a shading point.

A more detailed description of determining a shading point by a 3D rendering apparatus will be provided with reference to FIG. 3.

In operation 220, e.g., after a shading point has been determined, the 3D rendering apparatus performs the shading on the determined shading point. The 3D rendering apparatus may determine a color value of the shading point, as a shading value of the shading point, by performing shading on the shading point. For example, the shading may be based on an illumination effect by at least one virtual light source. The illumination effect may be based on a characteristic of light emitted from the virtual light source, for example, a color and a direction of the light, and on a characteristic of the 3D object in the 3D scene, for example, a color and a material of the 3D object, and may include a shadow effect by an occlusion. The virtual light source may include a direct light source configured to emit light directly to the 3D object, and an indirect light source configured to emit light from an area in which the light emitted from the direct light source is reflected, diffracted, or refracted.

Figure 8A:
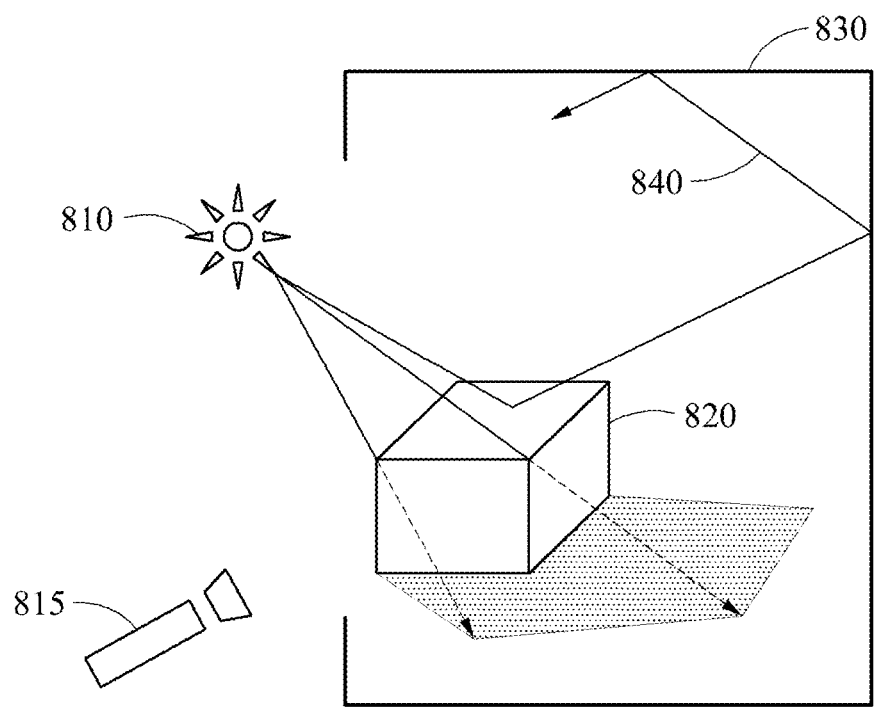
FIGS. 8A and 8B are diagrams illustrating an example of a relationship between a direct light source and an indirect light source.
Figure 8B:
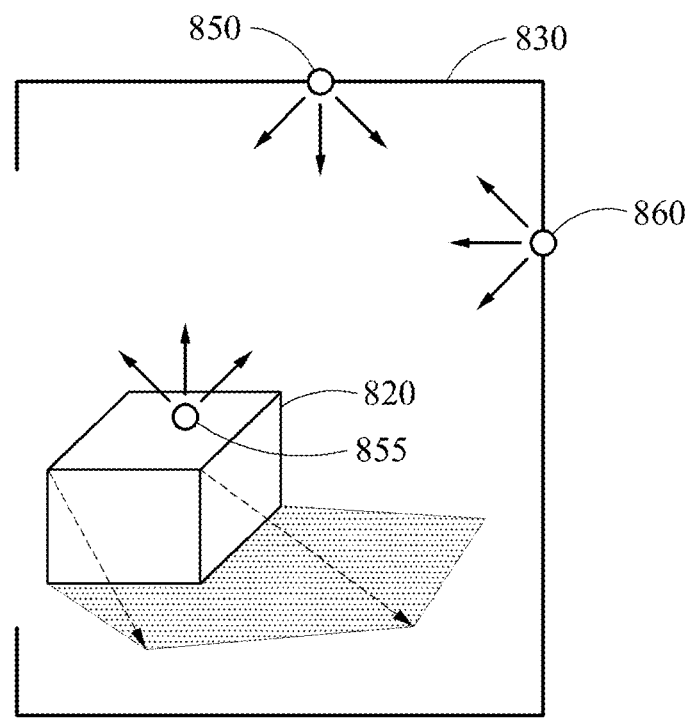

For example, FIGS. 8A and 8B are diagrams illustrating an example of a relationship between a direct light source and an indirect light source. The direct light source and the indirect light source are a virtual light source providing an illumination effect to a 3D object in computer graphics. The direct light source is a virtual light source configured to emit light directly to the 3D object, and the indirect light source is a virtual light source configured to emit light from an area in which the light emitted from the direct light source is reflected, diffracted, or refracted.

FIG. 8A illustrates a 3D object 820 and a 3D object 830 in a 3D model, and a direct light source 810. Although a single direct light source is illustrated in FIG. 8A for convenience of description, a plurality of direct light sources may be present in the 3D model. Referring to FIG. 8A, the direct light source 810 emits light directly to the 3D object 820. Based on a locational relationship between the direct light source 810 and the 3D object 820, a bright area and a dark area are determined in a virtual space in which the 3D object 820 is to be rendered. The light emitted from the direct light source 810 may be reflected, diffracted, or refracted by the 3D object 820. For example, as illustrated in FIG. 8A, light 840 output from the direct light source 810 is reflected by the 3D object 820 and reflected again by the 3D object 830, which is another 3D object, for example, a wall surrounding the 3D object 820. The 3D objects 820 and 830 may be rendered at a view of a virtual camera 815, and a rendered image may be provided to a user.

The 3D rendering apparatus may apply an illumination effect by light output from an indirect light source, in addition to a direct illumination effect by light output from the direct light source 810, and generate a detailed rendered image.

In another embodiment, the 3D rendering apparatus may obtain a more realistic illumination effect by arranging indirect light sources, in addition to a direct light source, in a 3D space.

For example, FIG. 8B illustrates an indirect light source 855, e.g., located at an area at which the light 840 output from the direct light source 810 would have been reflected by the 3D object 820, and an indirect light source 850 and an indirect light source 860, e.g., located at areas at which the light 840 would have been reflected by the 3D object 830. In rendering the 3D objects 820 and 830, an illumination effect by the indirect light sources 850, 855, and 860, in addition to an illumination effect by the direct light source 810, may be applied to the 3D objects 820 and 830. The indirect light sources 850, 855, and 860 may be affected by the direct light source 810 and also by characteristics of the areas at which the indirect light sources 850, 855, and 860 are located. For example, the illumination effect by the indirect light sources 850, 855, and 860 may be affected by a color or a material of a surface of a 3D object on which each of the indirect light sources 850, 855, and 860 is located.

Returning to FIG. 2, in operation 230, the 3D rendering apparatus determines shading information of the 3D scene based on a result of the shading performed in operation 220.

The 3D rendering apparatus may use interpolation to determine overall shading information of the 3D scene. For example, the 3D rendering apparatus may determine a shading value of a vertex adjacent to a shading point, i.e., a vertex for which shading was not performed in operation 220, by interpolating shading values of the shading points determined in operation 220. Although barycentric interpolation of applying a distance between the vertex and each of one or more shading points as a weighted value and performing the interpolation may be used here, the interpolation is not limited to such a barycentric interpolation, and various types of interpolation may be used.

As described above, the 3D rendering apparatus may store the determined shading values of the shading points on which the shading is performed in operation 220, and store the shading value of the vertex determined through the interpolation in operation 230. The shading values of the shading points and the shading value of the vertex may be respectively stored in, for example, a texture buffer of a graphics processing unit (GPU) of one or more embodiments, and the stored shading values may be used for shading to be performed on a subsequent image frame as well as for determining color values of pixels for subsequent pipeline operations. In addition, locations and attributes of the shading points and the vertex may be stored in the texture buffer. Using the stored shading values, the 3D rendering apparatus may reduce an amount of operations or calculations used for a shading operation and reduce occurrence of flickering. In one or more embodiments, the GPU may be represented by a combination of one or more of the vertex shader(s) 910 and/or pixel shader(s) 920 and shading point shader(s) 930 of FIG. 9, or the processor(s) 1020 or combination of processor(s) 1020 and memory or memories 1030 of FIG. 10A or 10B, as non-limiting examples. Here, it is also noted that each of the vertex shader 910, pixel shader 920, shading point shader 930 of FIG. 9 may respectively or collectively include a memory (i.e., cache) for storing or caching information between operations and the GPU may further include or access an external memory that may store multiple 3D graphics information for different scenes, frames, or objects, for example, for graphics processing and output by the graphics pipeline of the GPU.

In an example, the 3D rendering apparatus may adaptively or selectively update shading values of vertices in successive image frames of the 3D scene. Thus, shading values of corresponding vertices in the image frames may be updated according to different time intervals. The updating of a shading value may include determining a color value of a vertex by performing shading. For example, the 3D rendering apparatus may update a color value of a vertex located closely to a screen by performing shading on each image frame, e.g., with the close location or lesser depth representing a more observable or noticeable vertex, and update a color value of a vertex located remotely from the screen or present in a shadow area, e.g., with the remote or shadow area location representing a less observable or noticeable vertex, at an interval of the preset number of image frames, instead of updating the color value for each image frame. In this way, shading values for vertices that may be more observable or noticeable by a view may be updated more frequently than shading values for vertices that may be less observable or noticeable, compared to typical vertex level shading approaches where shading information for all vertices would be updated at the same time regardless of their observability or noticeability for image quality purposes.

The 3D rendering method may further generate a rendered image based on the shading information of the 3D scene. The 3D rendering apparatus may determine color values of pixels included in the rendered image based on the shading values of the shading points and the shading value of any of the vertices determined through the interpolation. For example, a shading point shader or a pixel shader of the 3D rendering apparatus may determine a pixel value of a current pixel by interpolating shading values of one or more shading points and one or more vertices that are adjacent to a particular pixel that is being rendered. Such an interpolation may be repetitively performed on each pixel included in the rendered image, and the rendered image may be generated through the repetitive performing of the interpolation. In the example where the pixel shader performs the interpolation for color value determinations, shading values stored to the texture buffer, as only an example, by the shading point shader may be accessed by or provided to the pixel shader, or the shading values may be provided directly by the shading point shader without storage in such a texture buffer.

FIG. 3 is a flowchart illustrating an example of a method of determining of a shading point.

Referring to FIG. 3, in operation 310, the 3D rendering apparatus may group vertices in a 3D scene into a plurality of vertex groups. The 3D rendering apparatus may group the vertices into the vertex groups based on their respective locations and attributes, for example, based on normals and colors of the vertices, based on results of corresponding shading performed on a previous image frame, or based on whether the vertices are included in a same 3D object, as only examples. As an example, the 3D rendering apparatus may set, to be a vertex group, vertices estimated to have a similar attribute among the vertices.

In an example, the 3D rendering apparatus may group vertices located adjacent to one another and having a similar attribute, for example, a normal, a depth, and a color, into a same vertex group. The 3D rendering apparatus may determine vertices estimated to have a similar attribute based on preliminary estimation or on a result of shading performed on a previous image frame. For example, the 3D rendering apparatus may group vertices having a similar color in a previous image frame into a same vertex group for a current frame.

In another example, the 3D rendering apparatus may group vertices included in a same 3D object or vertices having a similar shape characteristic into a same vertex group. In still another example, the 3D rendering apparatus may group, into a same vertex group, vertices of which colors change to be similar to one another over time, e.g., between frames, despite a spatial separation from one another, based on a change in color of a vertex over time, e.g., between frames.

The 3D rendering apparatus may determine hierarchical structure information associated with one or more shading points for each vertex group. The hierarchical structure information may define a hierarchical structure of shading points on which shading is to be performed based on a shading level to be determined in operation 320. For example, the hierarchical structure information may be an organization of the vertices of a vertex group into one or more different levels that respectively define which or whether vertices or non-vertex points are determined to be the shading points based on the determined shading level. In an embodiment, the hierarchical structure information may also be considered a tree structure, e.g., where depending on which level of the tree structure the vertices are arranged a shading sample can be determined for the eventual shading of one or more of the vertices and/or potentially one or more non-vertex shading points. Thus, below, when a shading level is discussed it may be understood that an upper level is referring to a shading sample/collection of vertex shading points and/or non-vertex shading points that includes less shading points than another level, just as a lower level is understood to include more shading points than another level. For example, when the shading level is adjusted to be higher, the number of shading points to be determined in a vertex group may decrease. When the shading level is adjusted to be lower, the number of shading points to be determined in a vertex group may increase. As an alternative, some upper and lower levels may represent a same overall number of sampling points but respectively less or greater number of vertices that are determined to be shading points, or the same overall number of sampling points but respectively less or greater number of non-vertex shading points.

In operation 320, the 3D rendering apparatus determines the shading level for each vertex group based on the hierarchical structure information associated with the shading points. At least one shading point in a vertex group on which the shading is to be performed may be determined based on the shading level. Here, some vertices among vertices included in the vertex group may be determined to be a shading point or another point in the 3D scene that is not a point at which the vertices are located may be determined to be an example non-vertex shading point.

The 3D rendering apparatus may determine the shading level, or a change in shading level, based on an analyzed temporal characteristic of the 3D scene, for example, a movement of a virtual light source, a virtual camera, and a 3D object based on time, or on an analyzed spatial characteristic of the 3D scene, for example, a location of a vertex and a difference in brightness among neighboring vertices. Here, different shading levels may be determined, or a desire to transition to an upper or lower shading level may be determined, for the vertex groups based on the temporal characteristic and/or the spatial characteristic analyses of the 3D scene.

In a temporal domain, when a moving speed of the virtual light source, the virtual camera, or the 3D object is greater than respective threshold values, the 3D rendering apparatus may adjust the shading level to be higher, e.g., to decrease the number of shading points. Thus, an amount of time that would have been expended for performing shading according to the typical shading level may be reduced. When a rapid rendering process is selected, needed, or determined desired, the 3D rendering apparatus may adjust an overall shading level to be higher. Conversely, when a moving speed of the virtual light source, the virtual camera, or the 3D object is less than such threshold values, the 3D rendering apparatus may adjust the shading level to be lower, e.g., to increase the number of shading points, for finer expression. Here, such respective moving speed threshold values may be the same or different and may change linearly or non-linearly as the moving speed differs.

The shading level may be adaptively determined based on the temporal characteristic of the 3D scene. For example, when a moving speed of the virtual camera or the 3D object is higher, e.g., such as where the virtual camera or 3D object is determined to have moved a greater amount between latest frames compared to between previous frame, the shading level may be adjusted to be higher. Conversely, when the moving speed of the virtual camera or the 3D object is lower, the shading level may be adjusted to be lower.

The 3D rendering apparatus may estimate a change in brightness of each area based on time using color information of a previous image frame, and adjust the shading level in an area in which the change in brightness is large to be lower and adjust the shading level in an area in which the change in brightness is small to be higher. For discerning the sufficiency of adjusting the shading level to be lower or higher, the determined change in brightness may be compared to respective lower/higher brightness change thresholds, which may be the same or different and may change linearly or non-linearly as the brightness level differs.

When a vertex is located in a determined central area, or a determined or user selected region of interest (ROI), of a screen in a spatial domain, or when a change in brightness among neighboring vertices is determined large, the 3D rendering apparatus may adjust the shading level to be lower for finer expression. Conversely, when a vertex is determined to be located on a periphery of the screen or the change in brightness among neighboring vertices is determined small, the 3D rendering apparatus may adjust the shading level to be higher, e.g., in order to decrease the number of shading points, and increase a speed for the rendering process. Here, the 3D rendering apparatus may estimate a difference in brightness among neighboring vertices in a current image frame, e.g., before shading is performed on the neighboring vertices in the current frame, using shading information of a previous image frame.

The 3D rendering apparatus may also set different shading levels for an area that is determined or set to be focused, e.g., either automatically or based on user interaction or selection, and a remaining area, or set different shading levels for an area to which a blurring effect is automatically set, or user set, to be applied and a remaining area. For example, in a lens-based device such as a head mounted display (HMD), sizes and densities of pixels viewed by eyes of a user may be different. In such an example, the 3D rendering apparatus may set a density of shading points to be relatively high in the central area that is to be automatically focused, or a gaze detected area, and adjust the shading level to be lower for the region or area that includes the central area or the gaze detected area. In this example, the 3D rendering apparatus may set the density to be relatively low in the remaining areas other than the central area or the gaze detected area, and adjust the shading level to be higher for the remaining areas.

In an example, the 3D rendering apparatus may determine an optimal shading level for each vertex group, e.g., starting from an uppermost shading level, which is a most coarse shading level, and progress through shading levels toward a lowest shading level, in descending order. The 3D rendering apparatus may progress through all shading levels or stop at a determined optimal level before reaching a lowest shading level. For example, the 3D rendering apparatus may compare a result of performing a first shading based on a first shading level that is an uppermost shading level to a result of performing a second shading based on a second shading level that is lower than the first shading level, based on the hierarchical structure information associated with the shading points, and may calculate a difference in color value based on a difference in shading level between the first shading and the second according to a result of the comparing. At the second shading level, the number of shading points may be greater than the number of shading points at the first shading level because the second shading level is lower than the first shading level according to the hierarchical structure information associated with the shading points. In response to the calculated difference in color value being less than a threshold value, the 3D rendering apparatus may determine the first shading level, which is a current shading level, to be a shading level for a current vertex group. Conversely, in response to the calculated difference in color value being greater than or equal to the threshold value, the 3D rendering apparatus may calculate a difference in color value based on the second shading level and a third shading level, where the third shading level is a lower shading level than the second shading level, and may determine whether the calculated difference is less than the threshold value. In response to the difference being less than the threshold value, the 3D rendering apparatus may determine the second shading level to be the shading level for the current vertex group. The 3D rendering apparatus may repetitively perform this calculated difference in color value comparison process with lower shading levels until determining the shading level at which the difference in color value becomes less than the threshold value to be a final shading level to be applied to the current vertex group or until the lowest shading level is reached in which case the lowest shading level is set to be the final shading level to be applied to the current vertex group.

The determining of an optimal shading level to be applied to a vertex group, starting from an uppermost shading level, may be performed each time an image frame is rendered, or may be performed each time a camera view, a location of a light source, or a location of an object changes. In another embodiment, the determining of the optimal shading level to be applied to the vertex group, starting from an uppermost shading level, may not be performed each time an image frame is rendered, but may be performed only when a camera view, a location of a light source, or a location of an object changes or when a predetermined number of frames or period of time have/has passed. However, a scope of examples is not limited to the examples described herein. When the 3D rendering apparatus determines that a change in a camera view, a location of a light source, or a location of an object is not sufficiently large among successive image frames, the determining of a shading level may be omitted for a current image frame and a shading level determined in a previous image frame may be applied in the shading of the current frame. The sufficiency of the change may be based on whether the change meets a change threshold.

In operation 330, the 3D rendering apparatus may determine at least one shading point for each vertex group based on the shading level, e.g., in an embodiment each shading level may include at least one shading point, with some embodiments having every lower level have an increased number of determinable shading points than an upper level. The 3D rendering apparatus may determine a shading point on which a shading operation is to be actually performed in accordance with the shading level based on the hierarchical structure information of each vertex group.

More particularly, for each shading level for a vertex group, the shading points may be determined in accordance with any one of: (1) the shading points may include only all vertices included in a current vertex group; (2) the shading points may include all vertices and one or more additional non-vertex points; (3) the shading points may include only some of the vertices of the current vertex group; (4) the shading points may include only some of the vertices and one or more additional non-vertex points; (5) the shading points may include one or more non-vertex points and none of the vertices; and (6) no shading points may be set or determined for a current vertex group so potentially no corresponding shading is performed for the current vertex group. For example, in an entire 3D scene, for an area corresponding to a vertex group, all vertices included in the vertex group may be determined to be shading points in accordance with option (1). For an area corresponding to another vertex group, at least one point that is not a vertex included in the other vertex group may be determined to be a shading point. In addition, as noted above, the shading level may be differently determined for different vertex groups. Still further, and as an example, though in the above options (3) and (4) only some of the vertices may be determined to be shading points, the number or relative positions of determined vertices may be different for either options (3) and (4) for different vertex groups, just as the number or relative positions of the non-vertex points for options (2), (4), and (5) may be different for any of options (2), (4), and (5) for different vertex groups.

Figure 4:
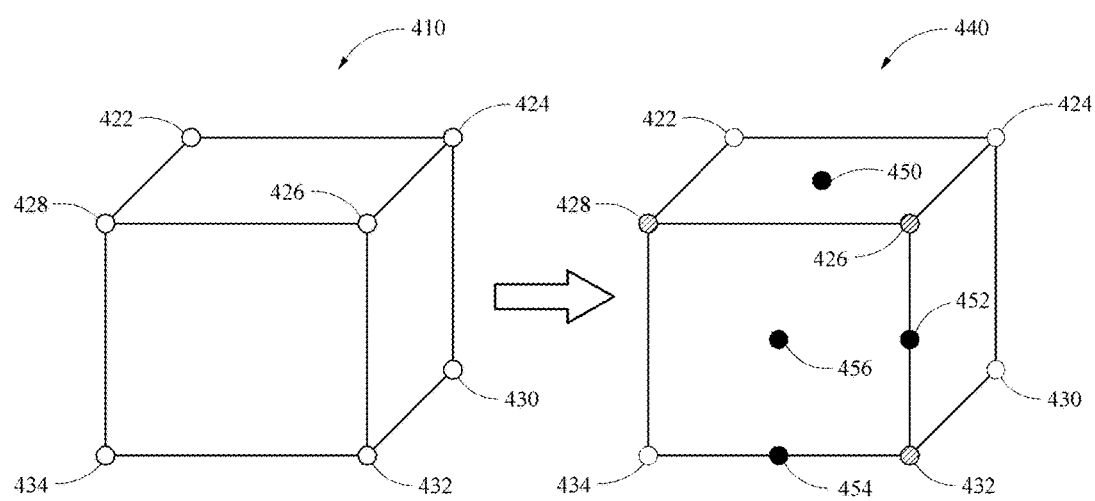
FIG. 4 is a diagram illustrating an example of a determining of a shading point.

FIG. 4 is a diagram illustrating an example of a determining of a shading point. In the example of FIG. 4, reference numeral 410 indicates a 3D object including a plurality of vertices, for example, a vertex 422, a vertex 424, a vertex 426, a vertex 428, a vertex 430, a vertex 432, and a vertex 434, and reference numeral 440 indicates a plurality of shading points determined for the 3D object 410, for example, a shading point 422, a shading point 424, a shading point 430, a shading point 434, a shading point 450, a shading point 452, a shading point 454, and a shading point 456.

In a typical vertex-based shading approach, e.g., where light shading is typically performed only in the vertex shader, the shading would be performed on each of the vertices 422 through 434 of the 3D object 410. However, in one or more embodiments, a 3D rendering apparatus may adaptively determine which points on which shading operations are to be performed based on a temporal characteristic and/or a spatial characteristic of a 3D scene. As illustrated in FIG. 4, the 3D rendering apparatus determines that only some of the vertices 422 through 434 of the 3D object 410 will be shading points on which the shading is to be performed, for example, shading will be performed only on the vertex 422, the vertex 424, the vertex 430, and the vertex 434, with the 3D rendering apparatus further determining that shading will also be performed on additional non-vertex points, for example, on point 450, point 452, point 454, and point 456. Accordingly, in accordance with the corresponding shading level which determined such select vertices and additional non-vertex points, the 3D rendering apparatus may perform shading on only shading points 422, 424, 430, 434, 450, 452, 454, and 456. Thereafter, the 3D rendering apparatus may determine the shading values of the remaining vertices on which the shading is not performed, for example, the vertex 426, the vertex 428, and the vertex 432, using the results from the shading performed on the shading points 422, 424, 430, 434, 450, 452, 454, and 456. For example, the 3D rendering apparatus may determine the shading value of the vertex 432 by interpolating the already determined shading values of the shading points 430, 452, and 454. The interpolation may be based on a set or predetermined number of closest neighboring shading points or those closest neighboring shading points within a set distance of a point to be interpolated, or a combination of both approaches.

Figure 5:
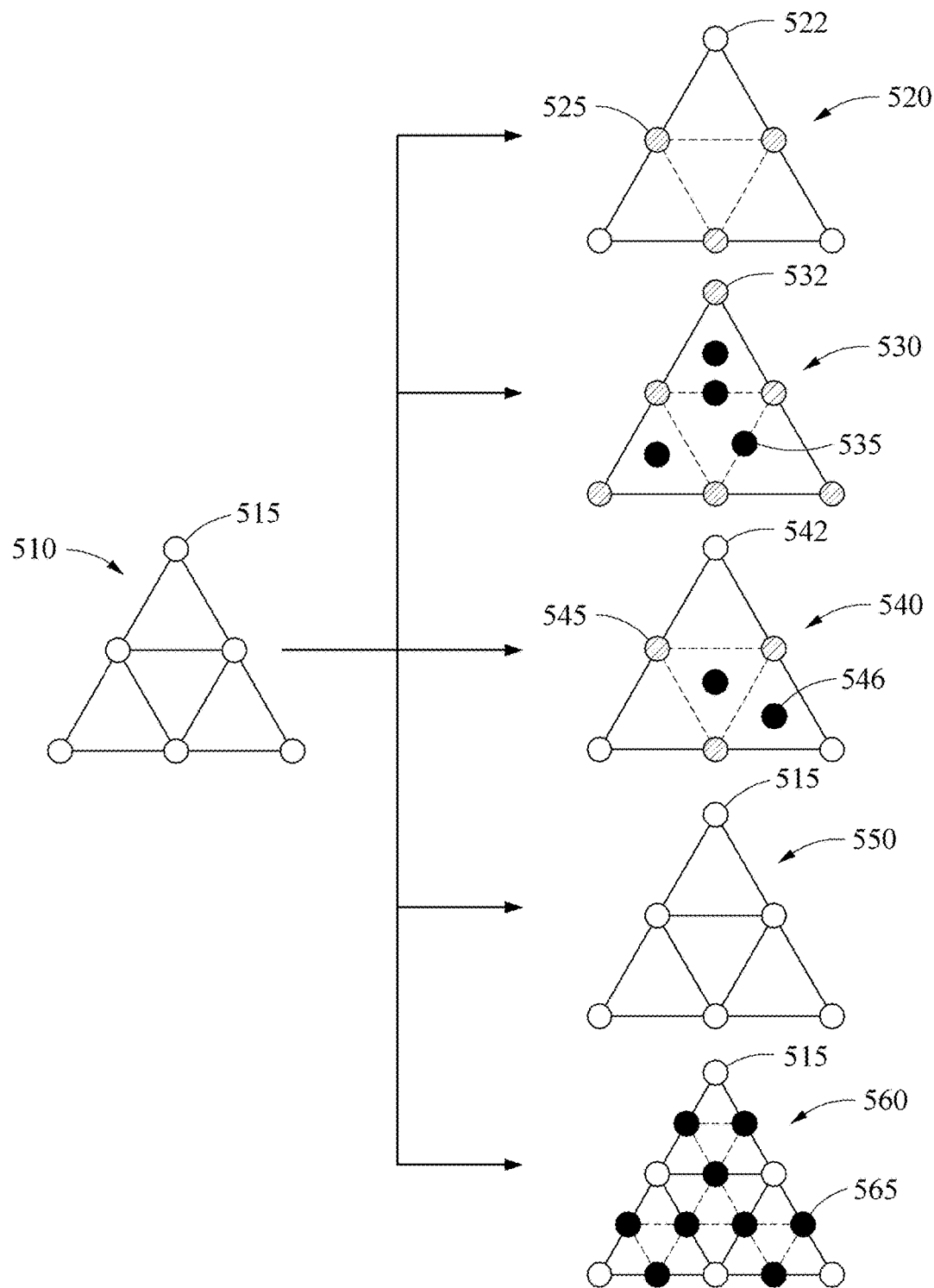
FIG. 5 is a diagram illustrating an example of a determining of a shading point based on a shading level.

FIG. 5 is a diagram illustrating an example of a determining of a shading point based on a shading level.

In the example of FIG. 5, reference numeral 510 indicates a 3D object including a plurality of vertices 515. A 3D rendering apparatus may generate hierarchical structure information associated with the vertices 515 of the 3D object 510, e.g., differentiating the vertices 515 into two or more hierarchical shading levels representing different respective and incremental shading complexities, and determine the shading points to perform shading on based on a determined shading level of the hierarchical shading levels represented in the hierarchical structure information. The shading point on which shading is to be performed may be determined in the 3D object 510 based on the shading level. For example, when the shading level is adjusted to be lower, the number of shading points on which the shading is to be performed may increase.

Referring to FIG. 5, at a first shading level 520, some vertices 522 among the vertices 515 of the 3D object 510 may be determined to be shading points. At the first shading level 520, only vertices 522 would be determined to be shading points while vertices 525 would not be determined to be shading points. The 3D rendering apparatus may perform the shading on the vertices 522, as shading points, to determine their respective shading values, and then determine/interpolate shading values of the remaining vertices 525 by interpolation using respectively select shading values of the vertices 522. In this example of shading level 520, the 3D rendering apparatus may perform the shading operation only on the vertices 522, instead of all the vertices 515, which may result in the rendering being performed more rapidly than if all vertices 515 were shading processed.

As only an example of the interpolation, the 3D rendering apparatus may perform Delaunay triangulation on the determined shading points, divide an area into sub-areas having a triangular shape, and determine shading values of the non-shading point vertices through interpolation using the shading values of the determined shading points.

In another example, the 3D rendering apparatus may determine the vertex points and/or non-vertex shading points based on an atlas, which may be an unfolded mesh of a corresponding 3D object, and perform shading on the determined vertex shading points and the determined non-vertex shading points, and determine/interpolate shading values of any remaining non-shading point vertices through interpolation using shading values of the determined vertex shading points and determined non-vertex shading points.

At a second shading level 530, none of the vertices 515 of the 3D object 510 are determined to be shading points, but rather, non-vertex points 535 are determined to be shading points. The 3D rendering apparatus may perform the shading on the points 535 that are determined to the shading point, and determine shading values of vertices 532 through interpolation of resultant values of the shading of the non-vertex points 535.

At a third shading level 540, similarly to the first shading level 520, vertices 542 are determined to be shading points among the vertices 515 of the 3D object 510, resulting in vertices 545 not being determined to be shading points. In addition, non-vertex points 546 in an area of the 3D object 510 may be additionally determined to be shading points.

For example, the locations of the non-vertex points 546 may be determined to correspond to a location in or on the 3D object 510, or determined based on a probability value using a brightness value distribution of the area of the 3D object 510. For example, when a brightness value of a point in or on the 3D object 510 increases, the probability or probability value for that point being determined to be a shading point may increase. As only an example, if the brightness increases beyond a threshold, or the probability value is greater than a threshold, then the point may be determined to be shading point. The brightness increase or probability value may be based on information from a previous frame, for example. The 3D rendering apparatus may perform the shading on the vertices 542 and the non-vertex points 546, and then determine/interpolate the shading values of the remaining non-shading point vertices 545 through interpolation of result values of the shading of the vertices 542 and the shading of the non-vertex points 546.

At a fourth shading level 550, all the vertices 515 of the 3D object 510 may be determined to be shading points, and the shading may be performed on each of the vertices 515. In this example, there may be no determined non-vertex shading points.

At a fifth shading level 560, non-vertex points 565 of the 3D object 510 may be additionally determined to be shading points, in addition to the vertices 515 of the 3D object 510. The 3D rendering apparatus may respectively determine the non-vertex points 565 based on a temporal or spatial characteristic of the 3D scene in which the 3D object 510 is represented. For example, when a finer shading effect is determined to be needed, for example, when an illumination effect is determined to be complicated, the 3D rendering apparatus may additionally determine the non-vertex points 565 in/on the area of the 3D object 510 on which the shading is to be performed. In an example, the non-vertex points 565 may be randomly determined in/on the area of the 3D object 510. The 3D rendering apparatus may then perform the shading on the vertices 515 and also the non-vertex points 565. In this example and the example of the fourth shading level 550, because shading is performed on all vertices 515, no further interpolation of other points is necessary.

Figure 6:
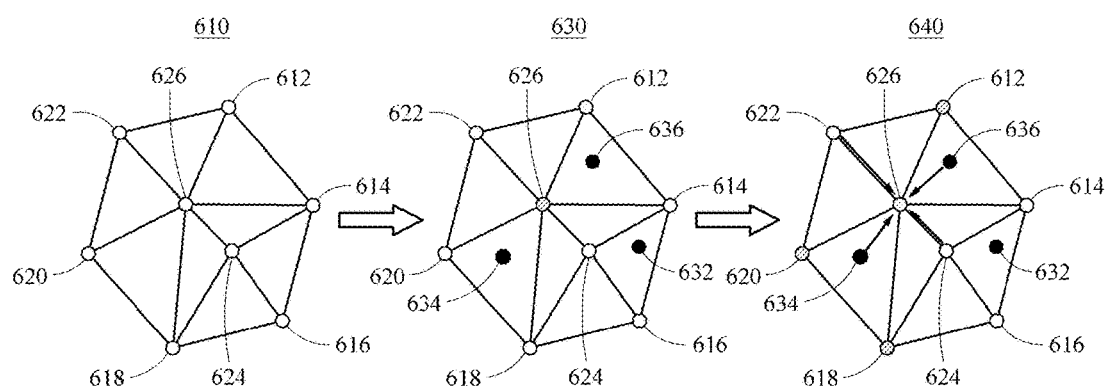
FIG. 6 is a diagram illustrating an example of a determining of a shading value of a vertex based on a result of a shading performed on a shading point.

FIG. 6 is a diagram illustrating an example of a determining of a shading value of a vertex based on a result of a shading performed on a shading point.

In the example of FIG. 6, it is assumed that a 3D object 610 includes a plurality of vertices 612 through 626. In illustrated stage 630, a 3D rendering apparatus determines the shading points on which shading is to be performed to include some of the vertices 612 through 626, for example, vertex 614, vertex 616, vertex 622, and vertex 624, and also to include non-vertex points in the 3D object 610, for example, the non-vertex point 632, point 634, and point 636. The 3D rendering apparatus then performs shading on the determined shading points 614, 616, 622, 624, 632, 634, and 636. The 3D rendering apparatus also determines shading values for the non-shading point vertices, for example, vertex 612, vertex 618, vertex 620, and vertex 626, based on the shading values, for example, color values, of the shading points 614, 616, 622, 624, 632, 634, and 636 that were determined in the performing of the shading. For example, in illustrated stage 640, the 3D rendering apparatus determines a shading value of the vertex 626 by interpolating shading values of the shading points 622, 624, 634, and 636 adjacent to the vertex 626. Similarly, the 3D rendering apparatus determines shading values of remaining non-shading point vertices on which the shading is not performed, for example, vertex 612, vertex 618, and vertex 620, using similar aforementioned interpolation processes. The shading values of the shading points 614, 616, 622, 624, 632, 634, and 636, and the shading values of the vertices 612, 618, 620, and 626 determined through the interpolation may be stored, such as in memory or a texture buffer. The stored shading values may subsequently be used for shading to be performed on a subsequent image frame.

Figure 7:
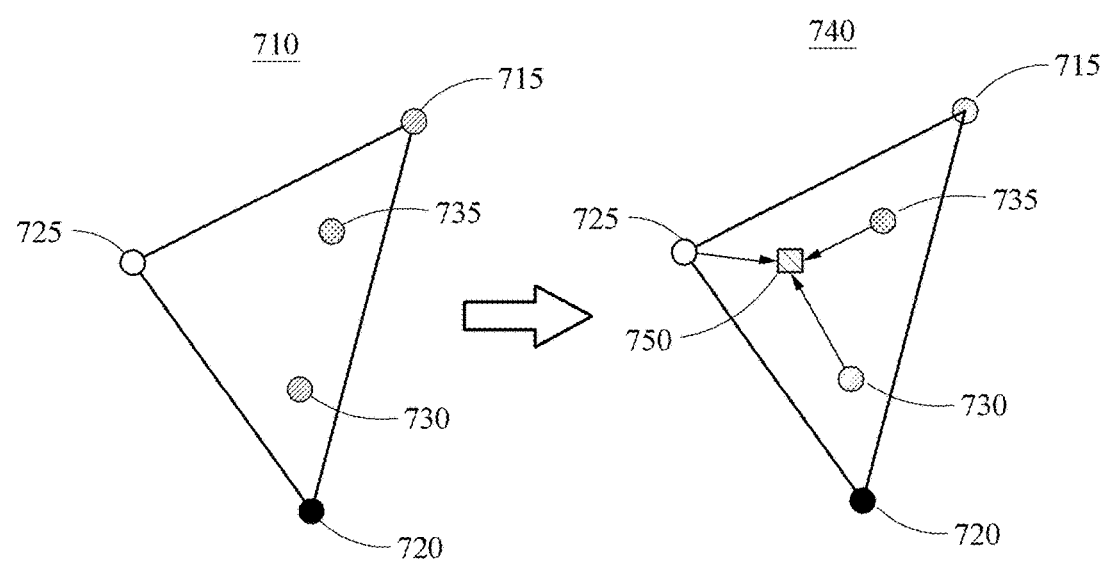
FIG. 7 is a diagram illustrating an example of a determining of a pixel value of a rendered image based on a shading value of a shading point.

FIG. 7 is a diagram illustrating an example of a determining of a pixel value of a rendered image based on a shading value of a shading point.

In the example of FIG. 7, it is assumed that shading values of vertices, for example, vertex 715, vertex 720, and vertex 725, and non-vertex points in/on a 3D object, for example, the non-vertex points 730 and 735, are respectively determined in illustrated stage 710. In illustrated stage 740, a 3D rendering apparatus determines color values of pixels by performing color interpolation for each pixel based on the shading values of the vertices 715, 720, and 725 and the non-vertex points 730 and 735. For example, as illustrated in FIG. 7, the 3D rendering apparatus determines a color value of a pixel 750 by interpolating the shading value of the vertex 725 adjacent to the pixel 750 and color values of the points 730 and 735. The 3D rendering apparatus may repetitively perform a similar process described in the foregoing and determine color values of pixels included in a rendered image.

Here, in an embodiment and as only an example, a rasterizer of the 3D rendering apparatus may determine such pixels from information results for a previous stage of the corresponding graphics pipeline operation of the 3D rendering apparatus, such as based on vertices determined by a vertex shader of the graphics pipeline, or a tessellation shader of the graphics pipeline that may be arranged after the vertex shader. A pixel shader of the graphics pipeline may then be provided or acquire the shading value results of the vertices 715, 720, and 725 and the non-vertex points 730 and 735, such as through a storing of the same in a texture or other memory or buffer by a shading point shader, operating separate from and in parallel with the graphics pipeline, and that performed the determining of shading values of the vertices 715, 720, and 725 and the non-vertex points 730 and 735. Such a shading point shader may implement the determining of the shading point. Here, such a reference to the vertex shader, tessellation shader, rasterizer, and/or pixel shader are only examples and embodiments are not limited thereto.

FIG. 9 is a diagram illustrating an example of a 3D rendering apparatus 900. Referring to FIG. 9, the 3D rendering apparatus 900 may include a vertex shader 910, a pixel shader 920, and a shading point shader 930. In one or more embodiments, the vertex shader 910 and pixel shader 920 may be elements of a graphics pipeline. The 3D rendering apparatus 900 may include multiple such graphics pipelines, some or all of which may also be configured to operate in parallel, for example. In addition, as noted above, such the graphics pipeline may further include a tessellation stage between the vertex shader 910 and the pixel shader 920, and a rasterizer between such a tessellation stage (or the vertex shader 910 when the tessellation stage is not present) and the pixel shader 920. In addition, the below discussions regarding the vertex shader 910, pixel shader 920, and shading point shader 930 are presented in brief for explanatory purposes, noting that aforementioned discussions regarding such vertex shaders, pixel shaders, and shading point and shading value determinations for FIGS. 1-8B are incorporated by reference and similarly applicable to the vertex shader 910, the pixel shader 920, and the shading point shader 930 of FIG. 9.

Accordingly, the vertex shader 910 may perform vertex transformation on vertices in a 3D scene based on acquired or provided 3D graphics data, such as vertex attribute information, which may include a spatial location, a color, a normal vector, and a texture of a vertex for the 3D scene and for one or more 3D objects in the 3D scene. The vertex transformation may include at least one of translocating a location of a vertex, transforming a normal vector of a vertex, and generating and transforming texture coordinates, as only non-limiting examples. In an example, the vertex transformation may include translocating a location of a vertex into a normalized coordinate space, such as corresponding to a screen coordinate space that a rendered image may ultimately be displayed.

The shading point shader 930 performs an operation associated with a shading process among the operations described with reference to FIGS. 1 through 8B. For example, the shading point shader 930 may group the vertices in the 3D scene into a plurality of vertex groups, and determine a respective shading level for each vertex group. The shading point shader 930 may determine one or more shading points on which shading is to be performed for each vertex group based on the determined shading level, and may perform shading on the determined shading points. The shading point shader 930 may further determine shading information of the 3D scene by determining a shading value of a non-shading processed vertex, i.e., a vertex on which the shading was not performed, by interpolating the resultant shading values of shading points on which the shading was performed.

The shading point shader 930 performs vertex-unit color shading, and such a color shading may be performed separately from respective rendering processes of the vertex shader 910 and the pixel shader 920. For example, the shading performed by the shading point shader 930 may be performed as a separate process from the graphics pipeline of the vertex shader 910 and the pixel shader 920. Thus, shading values of shading points and vertices may be stored by the shading point shader 930, such as in a texture buffer or other memory of the 3D rendering apparatus 900, for subsequent use by the graphics pipeline, or the shading point shader 930 may forward the determined shading values to one or more stages of the graphics pipeline without storing. The stored shading values may also be used to determine shading information of a subsequent image frame, such as when the shading point shader 930 determines that some vertices of a vertex group do not need to be updated every frame, and thus a correlation between image frames may increase, occurrence of flickering may be reduced, and an amount of calculations may be reduced compared to typical approaches where light shading was typically performed solely in the vertex shader and on all vertices for every frame.

In an example, the shading point shader 930 may determine a shading level for each vertex group based on a result of the shading of another vertex group or of the vertex group in a previous frame, for example. The shading point shader 930 may also determines an optimal shading level to be applied to each vertex group based on a determined difference in color values provided by different shading levels. For example, the shading point shader 930 may calculate a difference in color value based on a difference in shading level by comparing a result of shading performed based on a current shading level to a result of shading performed based on a shading level that is lower than the current shading level, and may adjust the current shading level in response to the difference in color value being greater than or equal to a threshold value. The shading point shader 930 may repetitively performs this process for different shading levels, e.g., incrementing through shading levels with increasing shading complexities, and may ultimately determine, to be the optimal shading level to be applied to a vertex group, a shading level where the difference in color value based on the difference in shading level is less than the threshold value. As only an example, the optimal shading level determination process may continue until the first time the difference in color is less than the threshold value, or the optimal level determination process may continue at least one shading level beyond the first shading for which the difference in color is less than the threshold level.

In one or more embodiments, when the shading information of the 3D scene is determined, the shading point shader 930 may transfer the shading information to the pixel shader 920, or merely store the shading information in a texture buffer available to the pixel shader 920. The pixel shader 920 may then perform color interpolation on each pixel based on the acquired or provided shading information. The pixel shader 920 performs the color interpolation using color values of vertices forming a polygon, for example, a triangle, to which a pixel is determined to belongs, such as by a rasterizer stage of the graphics pipeline or rasterizer operation of the pixel shader 920, and color values of shading points on which shading is performed, and thus a color value of each pixel in a rendered image is determined. In addition, the pixel shader 920 may perform texture mapping in which a texture is applied to a virtual 3D object to express a texture of the 3D object.

In another example, the 3D rendering apparatus 900 further includes an indirect light source sampler 940 configured to sample an indirect light source, such as described above with regard to FIG. 8B where at least reflections or refractions are represented by indirect light sources. The shading point shader 930 may perform the aforementioned shading using illumination information of the indirect light source in addition to illumination information of the direct light source, and thus the indirect light source is sampled by the indirect light source sampler 940. The sampling to be performed on the indirect light source may include arranging indirect light sources in a 3D space. The indirect light source sampler 940 controls an indirect illumination effect to be applied to a 3D object by adjusting an area in which the indirect light sources are to be arranged or adjusting the number of the indirect light sources to be arranged in the 3D space.

For example, the indirect light source sampler 940 samples an indirect light source in an image resulting from light view rendering, or samples an indirect light source using a ray tracing method applied to light. For example, the indirect light source sampler 940 may generate a probability map proportional to a brightness based on a brightness distribution of the image resulting from the light view rendering, and arrange the indirect light sources at a location determined based on the probability map. For another example, the indirect light source sampler 940 may determine an area in which light collides with a 3D object based on the ray tracing method, and arrange the indirect light sources in the determined area.

Figure 10A:
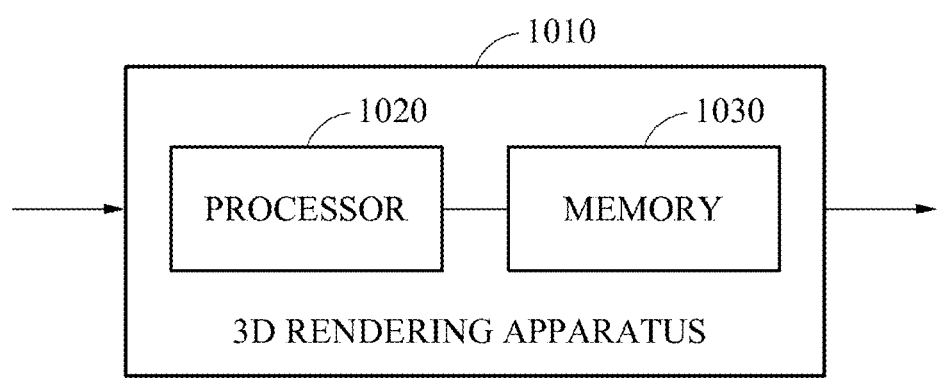
FIGS. 10A and 10B are diagrams illustrating examples of a 3D rendering apparatus.

FIG. 10A is a diagram illustrating an example of a 3D rendering apparatus 1010. Referring to FIG. 10A, the 3D rendering apparatus 1010 includes at least one processor 1020 and at least one memory 1030.

The processor 1020 performs at least one or more or all operations described with reference to FIGS. 1 through 9. For example, the processor 1020 may include one or more of the 3D rendering apparatuses 900 of FIG. 9, and be capable of performing additional operations. For example, the processor 1020 determines select shading points in a 3D scene on which shading is to be performed, and performs the selective shading on the determined shading points and selectively does not perform shading on one or more vertices. Rather, shading values for vertices for which shading is not performed may be determined through interpolation based on the shading results of the determined shading points. The processor 1020 groups vertices in the 3D scene into vertex groups, and may determine one or more shading points based on a shading level respectively determined by the processor 1020 for each vertex group. The processor 1020 determines shading information of the 3D scene based on a result of the shading performed on the shading point, and generates a rendered image based on the shading information. The rendered image may be stored in a memory as pixel information and/or output to a display connected to the 3D rendering apparatus 1010. A user interface may also be provided connected to the 3D rendering apparatus 1010.

The processor 1020 may be embodied as an array of logic gates, or another type of hardware as understood by a person having ordinary skill in the art. The processor 1020 may be representative of one or more processors configured to implement any or any combination of the above described operations as well as additional operations of a stationary or mobile device, for example. For example, to implement any or any combination of the above described shading operations, the processor 1020 may include at least one GPU to perform rendering on a 3D object. Shading information associated with a vertex and a shading point may be stored in a texture buffer of the GPU, and the stored shading information may be used to perform shading on a subsequent image frame.

The memory 1030 stores instructions to perform at least one operation described with reference to FIGS. 1 through 9, and/or stores data and results obtained while the 3D rendering apparatus 1010 is operating. In some examples, the memory 1030 may include a non-transitory computer-readable medium, for example, a high-speed random access memory and/or a nonvolatile computer-readable medium (e.g., at least one disk storage device, flash memory device, and other nonvolatile solid-state memory device).

Figure 10B:
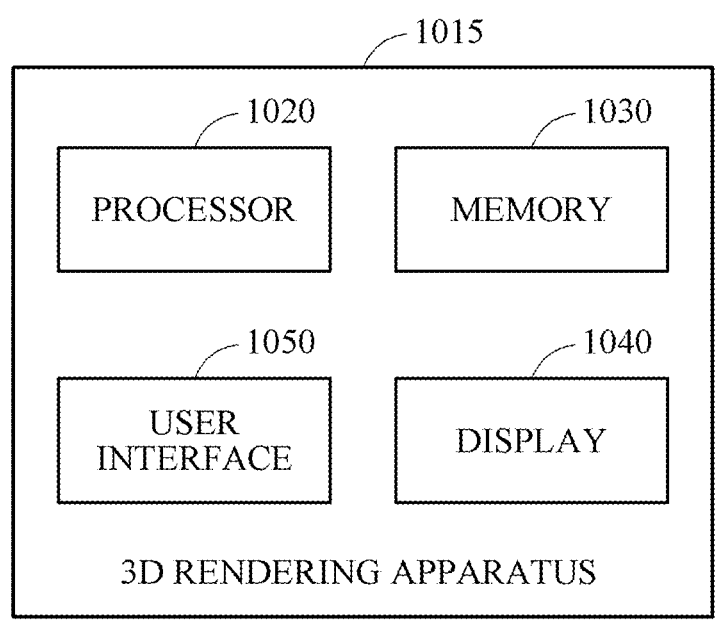

FIG. 10B is a diagram illustrating an example of a 3D rendering apparatus 1015. Referring to FIG. 10B, the 3D rendering apparatus 1015 includes the at least one processor 1020 and the at least one memory 1030 similar to FIG. 10A, and further includes at least the display 1040 and the user interface 1050. The processor 1020 may be representative of a single processor configured to implement any or any combination of the above described operations as well as additional operations of a stationary or mobile device, for example. The processor 1020 may be representative of two or more processors, including a graphics processor unit (GPU) including one or more of the graphics pipeline, shading point shader, and indirect light source sampler of FIG. 9, and at least one other processor configured to perform additional operations of a stationary or mobile device, for example. The processor 1020 may provide the determined pixel color information, i.e., based on the above shading operations, to the display 1040. The rendered images on the display 1040 may be changed or automatically change in response to interactions with the 3D rendering apparatus 1015 through the user interface 1050.

The vertex shader and vertex shader 910, pixel shader and pixel shader 920, rasterizer, shading point shader and shading point shader 930, indirect light source sampler 940, processor(s), core(s), processing element(s), and processor 1020, memories, caches, and memory 1030, display 1040, user interface 1050, and 3D rendering apparatuses and 3D rendering apparatus 1010 and 1015 described with FIGS. 1-10B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, the 3D rendering apparatus as described herein, and as illustrated in FIGS. 9 and 10A-10B, may be representative of a mobile device, such as a cellular phone, a smart phone, a wearable smart device (such as a ring, a watch, a pair of glasses, a bracelet, an ankle bracelet, a belt, a necklace, etc.), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented three-dimensional (3D) rendering method to render a 3D scene, the method comprising:
   determining, by a shading point shader, a select shading point, in a 3D scene on which shading is to be performed, based on a determined shading level for an area of the 3D scene, wherein the determining of the select shading point is distinct from a determining of another select shading point for another area of the 3D scene;
   performing, by the shading point shader, the shading on the determined shading point;
   determining, by the shading point shader, shading information of the 3D scene based on a result of the shading performed on the determined shading point; and
   rendering, by a pixel shader, an image by determining pixel color values from the determined shading information of the 3D scene,
   wherein the determining a select shading point comprises increasing a number of selected shading points in a first area of the 3D scene in which a number of vertices is less than a threshold number of vertices corresponding to a shading complexity of the first area and decreasing a number of selected shading points in a second area of the 3D scene in which a number of vertices is more than a threshold number of vertices corresponding to a shading complexity of the second area.

2. The method of claim 1, wherein the determining of the select shading point results in a different number of shading points being determined depending on which shading level, of shading levels representing different shading complexities, is determined according to temporal and/or spatial analyses of the area of the 3D scene as the determined shading level for the 3D scene.

3. The method of claim 1, wherein the determining of the select shading point includes determining less than all of vertices of an area of the 3D scene to be shading points on which the shading is performed.

4. The method of claim 3, wherein the determining of less than all of the vertices of the area of the 3D scene to be shading points further includes determining at least one non-vertex point on a 3D object in the area of the 3D scene to also be a shading point on which the shading is performed.

5. The method of claim 4, wherein the determining of less than all of the vertices of the area of the 3D scene to be shading points includes determining that no vertices of the area are selected as shading points.

6. The method of claim 4, wherein the determining of less than all of the vertices of the area of the 3D scene to be shading points includes determining that the shading points include at least one vertex of the area of the 3D scene.

7. The method of claim 6, wherein the determining that the shading points include at least one vertex of the area of the 3D scene includes determining that the shading points include all vertices of the area of the 3D scene.

8. The method of claim 3, further comprising:
   interpolating shading values for remaining vertices of the area of the 3D scene, other than the less than all of the vertices of the area of the 3D scene, based on results of one or more of the shading of the less than all of the vertices of the area of the 3D scene.

9. The method of claim 1, wherein the determining of the select shading point comprises:
   determining all vertices of a 3D object in the 3D scene and an additional point on the 3D object to be select shading points on which the shading is to be performed.

10. The method of claim 1, wherein the determining of the select shading point is based on either one or both of analyses of spatial characteristics and temporal characteristics of the 3D scene.

11. The method of claim 10, wherein the determining of the select shading point further comprises:
    determining the select shading point based on any one or any combination of any two or more of information associated with a virtual light source, information associated with a virtual camera, information associated with a 3D object in the 3D scene, and a result of shading performed on a previous image frame.

12. The method of claim 11, wherein the information associated with the virtual light source comprises information on any one or any combination of any two or more of a location, a color, a brightness, a direction, an angle, and a moving speed of the virtual light source,
    the information associated with the virtual camera comprises information on any one or any combination of any two or more of a location, a direction, an angle, and a moving speed of the virtual camera, and
    the information associated with the 3D object comprises information on any one or any combination of any two or more of a shape, a color, and a material of the 3D object.

13. The method of claim 10, wherein the determining of the select shading point further comprises:
    determining the select shading point based on any one or any combination of any two or more of information associated with a virtual light source, information associated with a virtual camera, and a result of shading performed on a previous image frame.

14. The method of claim 13, wherein the information associated with the virtual light source comprises information on any one or any combination of any two or more of a location, a color, a brightness, a direction, an angle, and a moving speed of the virtual light source,
    the information associated with the virtual camera comprises information on any one or any combination of any two or more of a location, a direction, an angle, and a moving speed of the virtual camera.

15. The method of claim 1, wherein the determining of the select shading point comprises:
    grouping vertices in the 3D scene into different vertex groups; and
    determining at least one select shading point for each vertex group.

16. The method of claim 15, wherein the grouping of the vertices comprises:
grouping the vertices into the different vertex groups based on any one or any combination of any two or more of respective locations of the vertices, respective normals of the vertices, a result of shading performed on a previous image frame, and which vertices are for a same 3D object.

17. The method of claim 15, wherein the determining of the select shading point further comprises:
determining a shading level for a first vertex group, of the different vertex groups, based on any one or any combination of any two or more of a movement of a virtual light source, a movement of a virtual camera, a movement of a 3D object, a difference in brightness between neighboring vertices, and a location of a vertex in the vertex group.

18. The method of claim 17, wherein the determining of the select shading point further comprises:
determining respective shading points on which the shading is to be performed for each vertex group based on respectively determined shading levels for each vertex group.

19. The method of claim 15,
wherein the grouping of the vertices comprises determining respective hierarchical structure information associated with vertices for each vertex group, each hierarchical structure information representing different complexity levels for each vertex group, and
the determining of the at least one select shading point for each vertex group includes selecting different respective shading points for each vertex group, based on which a complexity level is respectively determined for shading each vertex group from the respective hierarchical structure information.

20. The method of claim 1, wherein the determining of the shading information comprises:
determining a shading value of a vertex adjacent to shading points, for which shading was performed to determine their respective shading values, without performing shading by interpolating shading values from the respective shading values of the shading points.

21. The method of claim 20, further comprising:
determining color values of pixels in an image obtained by rendering the 3D scene by interpolating determined shading values of shading points, as determined in the determining of the shading information.

22. The method of claim 20, wherein the determining of the shading information comprises:
storing, in a texture buffer, the respective shading values of the shading points and the shading value of the vertex.

23. The method of claim 22, further comprising performing a pixel shading operation using the shading values stored in the texture buffer to determine color values of pixels in an image to render the image.

24. The method of claim 1, wherein the performing of the shading comprises:
determining a color value of the select shading point based on an illumination effect by either one or both of a direct light source and an indirect light source,
wherein the illumination effect comprises a shadow effect by an occlusion.

25. A non-transitory computer-readable storage medium storing instructions that, when executed by a processor, cause the processor to perform the method of claim 1.

26. A three-dimensional (3D) rendering apparatus, comprising:
a graphics pipeline comprising a vertex shader and a pixel shader; and
a shading point shader configured to:
determine a select shading point, in a 3D scene on which shading is to be performed, from among vertices of the 3D scene identified to the shading point shader by the vertex shader, based on a determined shading level for an area of the 3D scene, wherein the determining of the select shading point is distinct from a determining of another select shading point for another area of the 3D scene;
perform the shading on the determined shading point; and
determine shading information of the 3D scene based on a result of the shading performed on the determined shading point,
wherein the pixel shader is configured to render an image by determining pixel color values from the determined shading information of the 3D scene,
wherein the shading point shader increases a number of selected shading points in a first area of the 3D scene in which a number of vertices is less than a threshold number of vertices corresponding to the shading complexity of the first area and the shading point shader decreases a number of selected shading points in a second area of the 3D scene in which a number of vertices is more than a threshold number of vertices corresponding to a shading complexity of the second area.

27. The apparatus of claim 26, further comprising at least one memory configured to store computer-readable instructions to cause at least one processor to implement the determining of the select shading point, the performing of the shading, and the determining of the shading information, the at least one processor being configured to execute the instructions.

28. The apparatus of claim 26, wherein the shading point shader is further configured to:
determine whether to update a shading value of a current vertex in a subsequent image frame based on either one or both of a distance between the current vertex and a screen and whether the current vertex is located in a shadow area.

29. The apparatus of claim 26, wherein the shading point shader determines a shading value of at least one vertex adjacent to determined shading points and another non-vertex shading point, for which shading was both performed to determine their respective shading values, without performing shading on the one vertex and by interpolating shading values of the respective shading values.

30. The apparatus of claim 26, wherein the shading point shader
groups vertices in the 3D scene into vertex groups; and
determines at least one shading point for each vertex group based on a shading level.

31. The apparatus of claim 26,
wherein the shading point shader stores the shading information in a texture buffer, and
wherein the pixel shader generates pixel color information to render an image based on the shading information stored in the texture buffer.

* * * * *